No. 823,342. PATENTED JUNE 12, 1906.
T. W. LOVATT & C. PURSER.
WOODWORKING MECHANISM.
APPLICATION FILED OCT. 8, 1904.

4 SHEETS—SHEET 1.

Witnesses:
Inventors.
Thomas Wilson Lovatt
Charles Purser
By Henry Connett
Attorney No. 823,342. PATENTED JUNE 12, 1906.
T. W. LOVATT & C. PURSER.
WOODWORKING MECHANISM.
APPLICATION FILED OCT. 8, 1904.
4 SHEETS—SHEET 4.
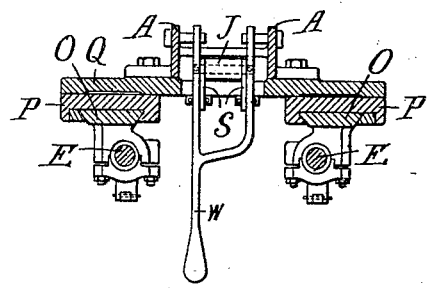
Fig. 4.
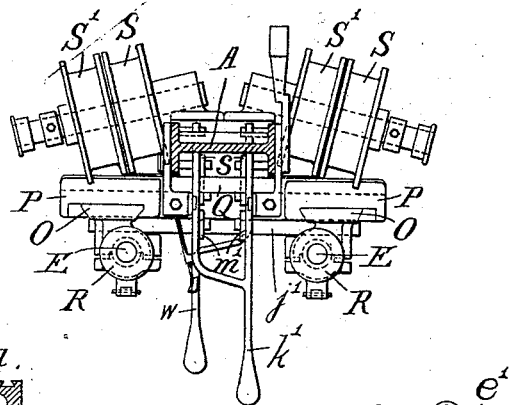
Fig. 8. Fig. 5. Fig. 9.
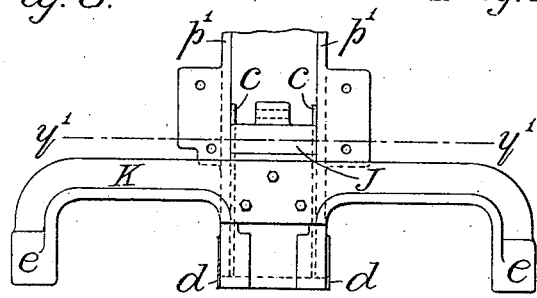
Fig. 6.
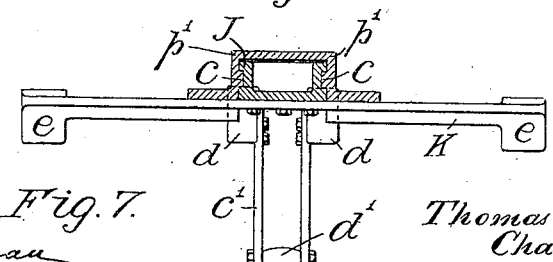
Witnesses: Fig. 7.
Inventors:
Thomas Wilson Lovatt
Charles Purser
by Henry Connett
Attorney

UNITED STATES PATENT OFFICE.

THOMAS WILSON LOVATT AND CHARLES PURSER, OF WOLVERHAMPTON, ENGLAND.

WOODWORKING MECHANISM.

No. 823,342.  Specification of Letters Patent.  Patented June 12, 1906.

Application filed October 8, 1904. Serial No. 227,707.

*To all whom it may concern:*

Be it known that we, THOMAS WILSON LOVATT, contractor, and CHARLES PURSER, foreman machinist, subjects of the King of Great Britain, residing at Wolverhampton, in the county of Stafford, England, have invented certain new and useful Improvements in Woodworking Mechanism, of which the following is a specification.

This invention has for its object novel or improved woodworking mechanism for use more especially in trenching and like operations, such as cutting out the housings for the treads and risers of staircases and the like, but which may be used for a variety of purposes.

The invention comprises not merely the combination forming the mechanism in its amplest or completest form, but portions thereof also which while constituting less complex forms of mechanism may be used in performing one or more of the functions of the complete mechanism.

For the sake of convenience we will describe the invention in its amplest or completest form, when it will be apparent that less combinations than the whole may themselves be used in cases in which mechanism is not required to perform all the functions for which the complete mechanism can be used.

A practical illustration of the invention is shown in its amplest or completest form by the drawings herewith, to which reference will be made in describing the invention.

Figure 1:
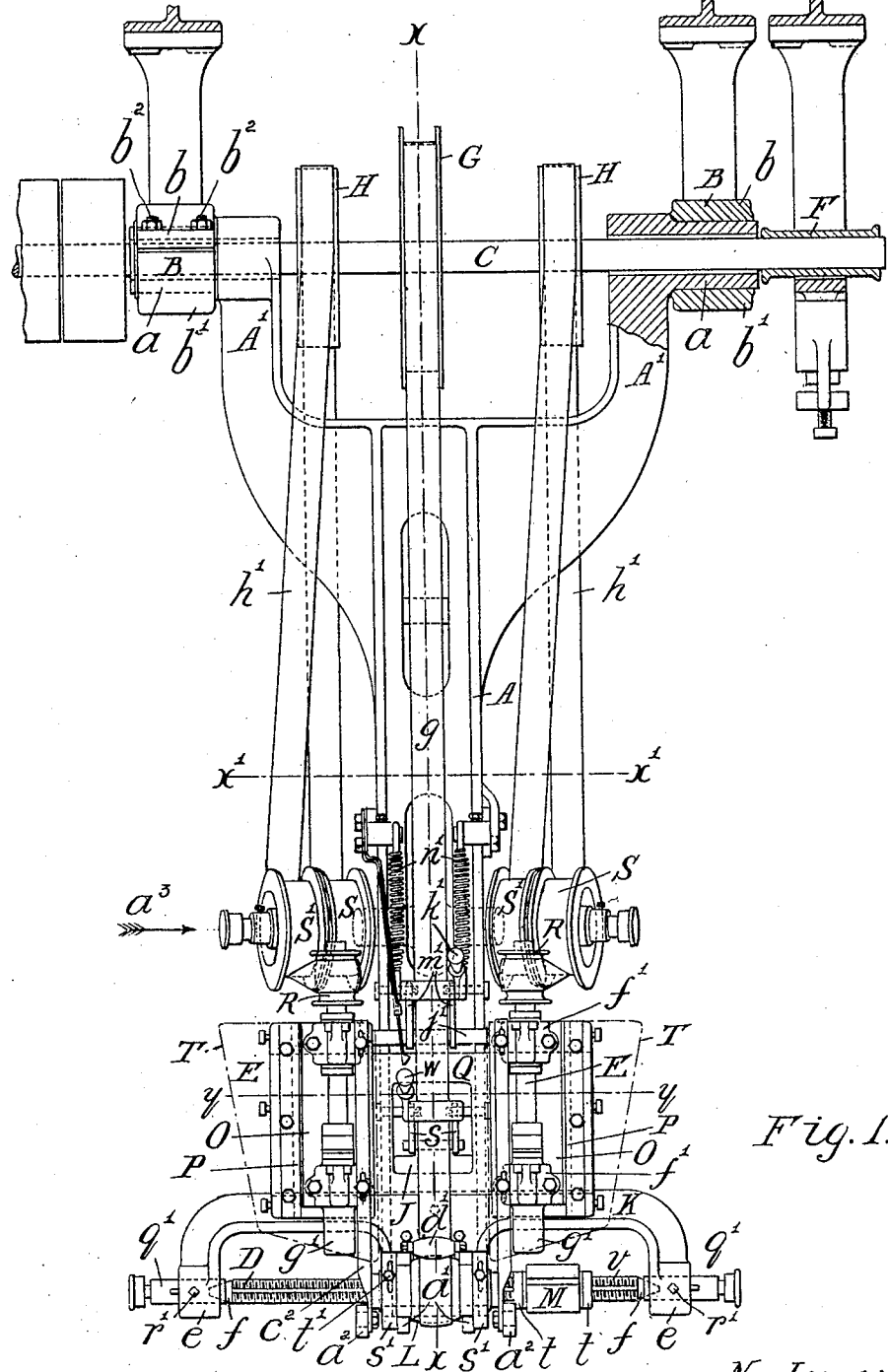
Figure 2:
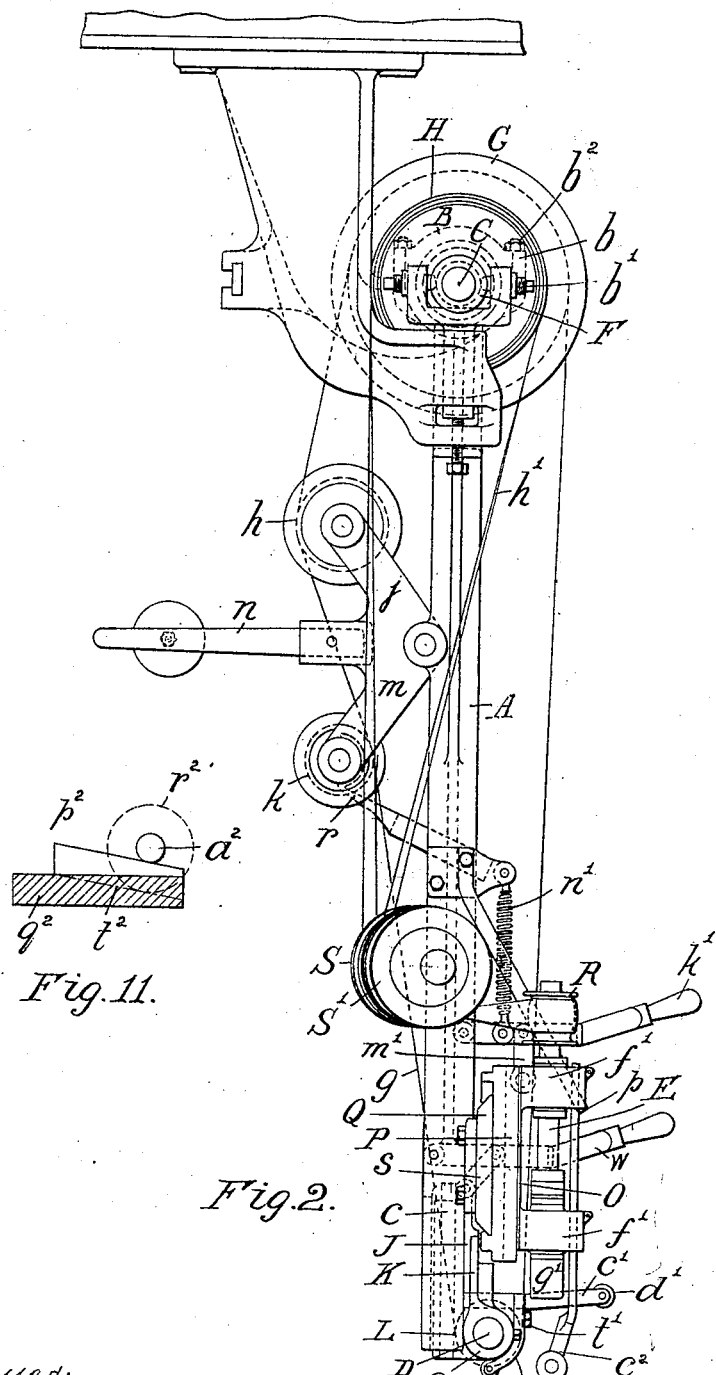
Figure 3:
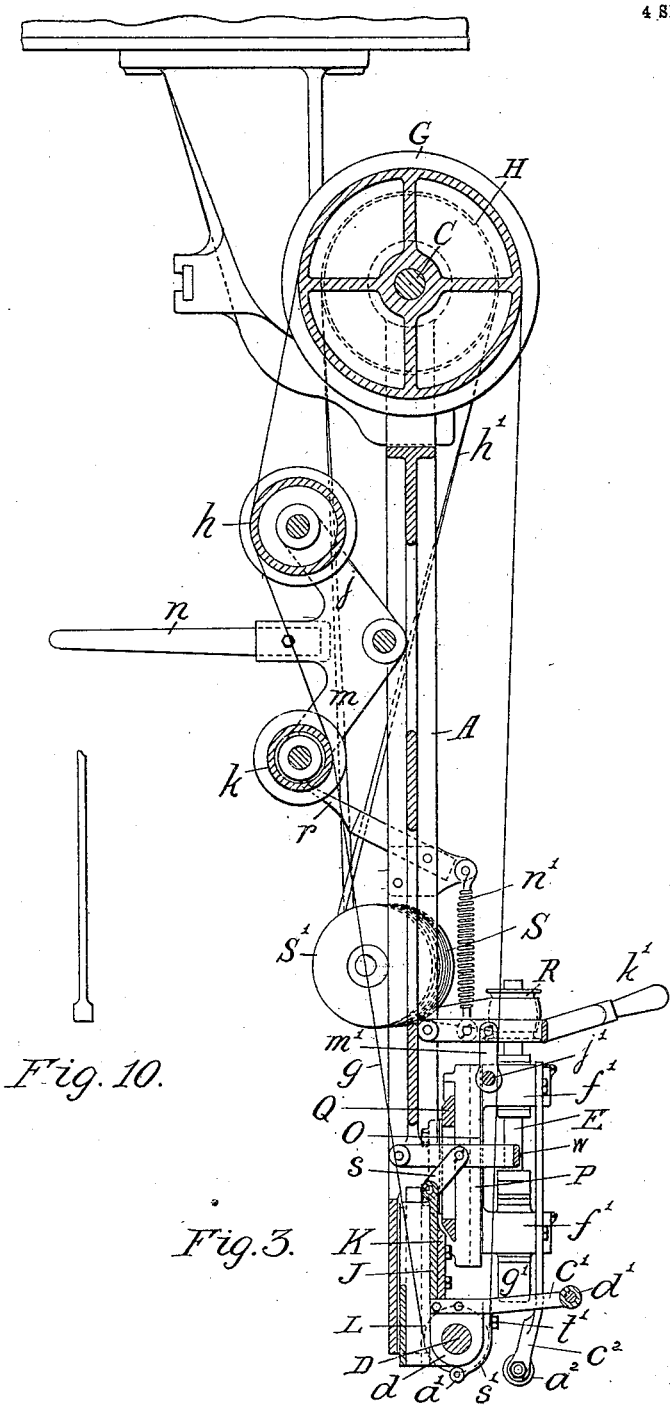

Of the drawings, Figure 1 is a rear view of the mechanism—that is to say, a view as seen from the side at which the operator stands when using it. Fig. 2 is a side elevation of the mechanism as seen looking in the direction of the arrow $a^3$ of Fig. 1. Fig. 3 is a vertical section of the mechanism, taken on line $x\ x$ of Fig. 1. Fig. 4 is a transverse section taken on line $y\ y$ of Fig. 1, certain parts which would appear below the plane of the section being omitted for the sake of clearness. Fig. 5 is a transverse section taken on line $x'\ x'$ of Fig. 1, certain parts which appear below the plane of the section being omitted in this view also. Fig. 6 is a detached rear view of the lower end of the swinging frame, middle slider, and bearings for the horizontal spindle, all hereinafter described. Fig. 7 is a transverse section taken on line $y'\ y'$ of Fig. 6, showing also the handle by which the frame is swung. Fig. 8 is a detached transverse section through a cutter-block of the horizontal spindle. Fig. 9 is a detached side elevation of a skate used for a purpose hereinafter shown. Fig. 10 is a side elevation of a plain adjustable stop, which may under some circumstances be used in lieu of another form of stop hereinafter described. Fig. 11 shows a method of using the mechanism with a "former" placed upon the wood to be operated upon.

A swinging or pendulous frame or arm A is suspended from suitable bearings B, of which the one to the right hand, Fig. 1, is shown in section, and the axis of suspension is common with that of a shaft C, through which the power is transmitted from a prime mover to a horizontal spindle D and to two vertical spindles E, which are carried by the lower end of the suspended frame. The frame A is bifurcated at its upper end, and at the end of each member A' of the bifurcation is formed an outward trunnion $a$. These trunnions are carried, respectively, in the bearings B and constitute the means of suspension of the frame from such bearings. The right-hand trunnion, Fig. 1, together with the end of the corresponding member A' of the bifurcation, is shown in section. Each trunnion-bearing is preferably divided into an upper part $b$ and a lower part $b'$, which may be drawn together by means of bolts $b^2$ to put upon the trunnions any degree of friction which may be required to guard against the frame overrunning as it is turned by the operator into any desired position. The shaft C passes through the trunnions $a$ with a clearance-space between itself and the interiors of the trunnions and is supported at its ends in suitable bearings F, which are preferably of the well-known self-leveling type.

Upon the shaft C and within the bifurcated portion of the frame A are fixed a central pulley G and two side pulleys H.

At the lower end of the frame A, and at the middle thereof, is mounted a slider J, which is capable of sliding along vertical guides $c$, which project from opposite sides $p'$ of the frame into corresponding grooves formed in opposite sides of the slider. This slider (which is shown as in about its mid-position) carries four bearings, which have a common horizontal axis—namely, two middle bearings $d$ and two outer bearings $e$, formed down from a bar K, which is fixed to the face of the slider J. The horizontal spindle D is carried in the two middle bearings $d$ and has conical ends $f$, which are centered in the ends of pins $q'$, fitted within the bearings $e$, within which they may be adjusted endwise and within which they are secured by set-pins $r'$. Upon this spindle and between the middle bearings $d$ is fixed a pulley L, (shown by a broken-line circle only in Fig. 3,) which is driven by a belt $g$ from the pulley G, and one side of this belt passes over the outer side of a pulley $h$, carried between a pair of arms $j$, which are pivoted to the frame A and over the inner side of a pulley $k$, which is carried between a pair of arms $m$, which are rigid with the arms $j$. A pair of weighted levers $n$, which are rigid with the arms $j$ and $m$, tend to turn them in a downward direction and maintain the belt $g$ taut while it is driving the pulley L. The slider J is held up when not actually in use by a spring-catch $p$, and as the slider is raised into its upward or inoperative position one of the arms $m$ comes down upon a stop $r$, and thus allows the belt $g$ to run sufficiently slack to insure that it will not drive the pulley L. The spindle D has mounted on each portion thereof which is between one of the middle and one of the outer bearings a block M, of which only one is shown in Fig. 1, to which cutting-tools for troughing, molding, or the like may be fixed. The portions of the spindle D between the middle and outer bearings are screw-threaded, and the cutter-blocks are fixed in position endwise therealong, where required, by means of lock-nuts $t$; but to avoid any risk of the spindle turning within the blocks each block is preferably provided with a fixed key or feather $u$, (see Fig. 8,) which is fitted to slide along a groove $v$ of the spindle.

A forked hand-lever $w$ is pivoted to the frame A, and each side of its fork is connected, by means of a link $s$, with the slider J. The slider J, and consequently the spindle D which it carries, are moved down by the hand-lever $w$, to bring into operation upon any work which may be fixed on a table below any tool or tools carried by such spindle, and the slider is raised again by such hand-lever to bring the tools clear of the work, until it is engaged by the spring-catch $p$, the head of which, being beveled for the purpose, latches itself under the hand-lever. The catch is disengaged from the hand-lever by the operator when the slider is to be lowered again, and immediately the head of the catch is clear of the hand-lever the slider falls until it tightens the belt $g$, after which the slider is moved down by the hand-lever against the force of the weighted levers $n$, such latter levers rising as the belt $g$ is further tightened. The belt-tightener tends to raise the slider again when the force by which it has been moved down is relaxed, and the initial portion of such raising is effected, or largely so, by the pull of the belt-tightener.

Rollers $a'$, which are adjustable as to height and are for the purpose of bearing upon and traveling along the surface of the wood which is being operated upon by cutters which are carried by the spindle D, are carried by brackets $s'$, which are fixed to the bearings $d$, respectively, of the slider J, by means of set-pins $t'$, which pass through slotted holes of the brackets. These rollers are arranged at such height relatively to such spindle as to allow the cutters to cut down into the wood the required depth only, and with a view to accuracy of results their centers should be on the vertical line which, as seen in a side elevation of the mechanism when the arm A is vertical, passes through the center of the spindle D.

For convenience in swinging the frame A a pair of arms $c'$ project in an upwardly-inclined direction from the two middle bearings $d$ of the spindle D and are connected together at their outer ends by a handle-bar $d'$.

The mechanism as thus far described is utilized in the following manner—that is to say, the wood which is to be operated upon by cutters of the spindle D is fixed upon a table or bed N, of which the top is indicated by a single line, Figs. 1, 2, and 3, which is below the mechanism, the table being preferably adjustable as to height. To enable the work to be conveniently fixed upon the table N, the pivoted frame A may be swung somewhat out of the perpendicular if, owing to the position of its center of gravity, it does not normally hang sufficiently out of the perpendicular for the purpose. The frame is then moved inward to bring it into the position required for the cutters to commence cutting, the cutters being brought down to cut into the wood as deeply as the rollers $a'$ will allow, through the medium of the hand-lever $w$, and the frame is gradually moved upon its axis of suspension to travel the cutters along the wood, the rollers $a'$ rolling upon the surface of the wood and the slider J moving vertically within its guides to adjust itself to the constantly-varying distance between the axis of suspension of the frame A and the surface of the wood which is being operated upon.

If the work to be performed is such that the rollers $a'$ would be liable in traveling over the surface of the wood which is being operated upon to cross holes in such surface into which they might drop, pivoted skates, such as the skate $e'$, shown in side elevation, Fig. 9, are substituted for the rollers, being each of such length that it will pass over a hole without in any degree passing thereinto.

A circular saw, or two or more circular saws, may be carried by the spindle D, or there may be mounted on such spindle any form of tool which may be carried between the bearings of a revolving spindle, and the bearings for the spindle may of course be made to project from the bar K any distance which may be necessary to suit the kind of tools which such spindle is required to carry.

At the lower end of the frame A and at opposite sides of the central plane which lies in the direction of the movement of the arm are mounted sliders O, each of which is capable of sliding in vertical guides P, rigidly connected with the frame A. These sliders are shown as at about the middle of their stroke. Mounted within suitable bearings $f''$ of these sliders are the vertical spindles E, one for each slider. On the upper end of each spindle E is fixed a pulley R, and on the lower end is formed a head $g'$ to receive any desired form of cutter. The spindles E are driven by the pulleys H, respectively, of the shaft C, each through the medium of a belt $h'$, which is guided in an approximately horizontal direction to and from the corresponding pulley R by guide-pulleys S S', having their axes fixed in relation to the frame A. A transverse carrying-bar $j'$ passes at its ends through and is just a sliding fit within the upper portions of the sliders O, and a forked hand-lever $k'$ is pivoted to the frame A, and each side of the fork is connected, by means of a link $m'$, with the transverse bar $j'$. The sliders O are normally held up by springs $n'$, each of which is connected at its upper end to the frame A and at its lower end with one of the fork sides of the hand-lever $k'$, one of the springs being connected with one fork side and the other spring with the other fork side. The sliders O and the spindles E, which they carry, may be moved down in relation to the frame A by depressing the hand-lever $k'$. The portions of the belts $h'$ which are between the guide-pulleys S S' and the pulleys R being (approximately) horizontal insure that the vertical movements of the sliders will not materially affect the tension of the belts. Each pair of vertical guides P within which a slider O is capable of sliding is carried upon a horizontal guide Q, which is bolted across the rear face of the frame A and along which they may be slid to bring the spindles E into any desired position sidewise. The guides P are rigidly secured to the guide Q when the spindles are in their desired positions.

The spindles E may be brought down so that the tools which they carry may bore holes in the wood either prior or subsequently to the operation of the tools which are carried by the spindle D or independently of any work being performed by such last-mentioned tools.

Rollers $a^2$, (or skates, such as $e'$, in lieu thereof,) carried by brackets $c^2$, fixed to the sliders O and adjustable as to height, limit the depth to which the tools in the ends of the spindles E can cut into the wood. If such tools are required simply to bore into the wood, but to some particular depth, plain adjustable stops, of which one is shown by Fig. 10, may be used instead of rollers or skates; but rollers or skates will usually be required if such tools are to be used, as they may be, in traveling along the wood while cutting. The stop shown by Fig. 10 is capable of being substituted for a bracket $c^2$ and roller $a^2$, or skate in lieu of such roller.

For some purposes only a single tool or set of cutters may be required upon the spindle D, and for some purposes only one of the spindles E be required to carry a tool, and for some operations rollers, or skates in lieu thereof, or stops to limit the depth of cut of a tool or tools may be dispensed with. One of such rollers, skates, or stops may be used instead of a pair, if required only in respect of a single tool or in respect of tools which are near together, the chief function of the rollers, or of skates used in lieu thereof, being to insure while a slider carrying an operating-tool is pressed down an automatic adjustment of the slider and a uniform or substantially uniform depth of cut as the tool is traveling.

Sheet-metal shields T, used as a protection against the flying shavings and borings from the tools, are indicated in Fig. 1 by broken lines.

The mechanism may, as will be obvious, either in whole or in part be used for a variety of operations required in woodworking. As an example of the use of the complete machine, the nosing of a housing for a staircase-tread may be bored in by a tool carried by one of the vertical spindles E and afterward the straight portion of the housing cut in up to the nosing by a set of cutters carried by the horizontal spindle D, and the tool carried by the vertical spindle may be utilized in cutting somewhat lengthwise from the nosing, if desired. When a tool is carried by each vertical spindle and two sets of cutters are carried by the horizontal spindle, the mechanism may be used in cutting a housing in two staircase-strings at the same time.

If it is desired to cut along the surface of the wood to varying depths, the roller or rollers used in respect of any tool or tools may run along the surface of a former, such as $p^2$, Fig. 11, placed upon the wood to be operated upon, such tool or tools in such case cutting to a uniform or substantially uniform depth from the surface of the former. In Fig. 11 a roller $a^2$ is shown as running upon the inclined surface of the former $p^2$, which is upon the piece of wood $q^2$ into which a cutter, of which the circle of revolution is indicated by the broken-line circle $r^2$, cuts a groove having an inclined bottom, (indicated by the broken line $t^2$.)

It will be obvious that the mechanism may be varied considerably in detail without departing from the nature of the invention, of which the main features are a swinging or suspended frame, a spider at the lower end of the frame carrying a horizontal spindle for a tool or tools, and the vertical spindles carried also by the swinging frame and adapted to be raised or lowered in relation thereto and to carry tools and the rollers or skates in lieu thereof to limit the depth of cut of the tool or tools. We do not, therefore, limit ourselves to the exact details as illustrated, but claim as being within the scope of the invention such variations and modifications as may be reasonably expected to occur to the mind of a person skilled in the art to which the invention relates on a careful perusal of this specification. It will also be obvious that lesser combinations than those which go to make up the complete mechanism described, but which are novel in themselves, may in some cases be advantageously used independently, and that some features are in themselves novel and useful, though they may not be capable of being used otherwise than with certain other portions of the mechanism as described.

Having thus described our invention, what we claim, and desire to secure by Letters Patent, is—

1. In woodworking mechanism, the combination of fixed upper bearings, a swinging frame or arm suspended directly from such bearings, a revolving tool-spindle carried by the lower portion of such frame or arm, a gage or bearer carried by the frame or arm and movable vertically with the spindle, a lever pivoted to the frame or arm, by means of which lever the spindle may be pressed down by hand, relatively to the frame or arm and the gage or bearer thereby caused to travel along a stationary surface the spindle being thereby automatically adjusted in relation to the frame or arm, and the depth of cut, in relation to the surface on which the gage or bearer travels, rendered uniform or substantially so, as set forth.

2. In woodworking mechanism, the combination of upper bearings, a swinging frame or arm suspended directly from such bearings, a vertical slider carried directly by the lower portion of such frame or arm, a revolving tool-spindle carried by such slider, a gage or bearer carried by the slider, and adapted to press upon and travel along the surface of the work or of a "former," a lever pivoted to the frame or arm by means of which the slider may be pressed down by hand and the gage or bearer thereby caused to travel along the surface of the wood which is being operated upon, or of a "former," the slider being thereby automatically adjusted in relation to the frame or arm, and the depth of cut, from the surface on which the gage or bearer travels, rendered uniform or substantially so, as set forth.

3. In woodworking mechanism, the combination of upper bearings, a swinging frame or arm suspended directly from such bearings, a vertical slider carried directly by the lower portion of the frame or arm, a vertical revolving tool-spindle carried by such slider, a gage or bearer carried by such slider and adapted to press upon and travel along the surface of the work or of a "former," and means by which the slider may be pressed down to bring the cutter of the spindle into the wood to be operated upon and the gage or bearer upon the surface of the wood or of a "former," and the gage or bearer be pressed down upon such surface or former while the tool is traversed by turning the frame or arm upon its axis of suspension, substantially as set forth.

4. In woodworking mechanism, the combination of upper bearings, a swinging frame or arm suspended directly from such bearings, a transverse guide thereon, a vertical guide carried by and adjustable along said transverse guide which is carried by the lower portion of such frame or arm, and a vertical revolving tool-spindle movable vertically and guided by such vertical guide, substantially as set forth.

5. In woodworking mechanism, the combination of upper bearings, a swinging frame or arm suspended from such bearings, a vertical slider carried by the lower portion of such frame or arm, a horizontal revolving tool-spindle carried by such slider, a second vertical slider also carried by the lower portion of such arm, a vertical revolving tool-spindle carried by such second slider, and means whereby each slider may be pressed down independently by hand relatively to such frame or arm, substantially as set forth.

6. In woodworking mechanism, the combination of upper bearings, a swinging frame or arm suspended from such bearings, a vertical slider carried by the lower portion of such arm, a horizontal revolving tool-spindle carried by such slider, a second vertical slider also carried by the lower portion of such arm, a vertical revolving tool-spindle carried by such second slider, a shaft having an axis common with that of the axis of suspension of the frame or arm, pulleys carried by such shaft, pulleys carried by the tool-spindles, and means by which such latter pulleys are driven from the pulleys carried by the shaft, and means by which said sliders may be pressed down independently by hand relatively to the arm, substantially as set forth.

7. In woodworking mechanism, the combination of upper bearings, a swinging frame or arm suspended from such bearings, a vertical slider carried by the lower portion of such frame or arm, depth-gaging means carried by said slider, a horizontal revolving tool-spindle carried by such slider, an overhead driving-shaft, a pulley carried by such shaft, a pulley carried by the tool-spindle, a belt which transmits motion from the shaft-pulley to the spindle-pulley, a belt-tightening device for such belt, and a lever pivoted to the frame or arm by means of which the slider may be moved down against an upward pull of the belt, upon the surface of the work or upon a "former," substantially as set forth.

8. In woodworking mechanism, the combination of upper bearings, a swinging frame or arm suspended from such bearings, a vertical slider carried by the lower portion of such frame or arm, a horizontal revolving tool-spindle carried by such slider, an overhead shaft, a pulley carried by such shaft, a pulley carried by the tool-spindle, a belt which transmits motion from the shaft-pulley to the spindle-pulley, a belt-tightening device for such belt, means by which the slider is moved down against an upward pull of the belt, and a stop to arrest the action of the belt-tightener, whereby when the slider is raised to its upward position, after being moved down, the belt is slackened and the rotation of the spindle stopped, substantially as set forth.

9. In woodworking mechanism, the combination of upper bearings, a swinging frame or arm suspended from such bearings, a vertical slider carried by the lower portion of such arm, a horizontal revolving tool-spindle carried by such slider, a vertical revolving tool-spindle carried by such arm and capable of endwise movement in relation thereto, and means through which the slider and the vertical tool-spindle may be independently pressed down by hand, substantially as set forth.

10. In woodworking mechanism, the combination of upper bearings, a swinging frame or arm suspended from such bearings, two vertical sliders carried by the lower portion of such frame or arm, vertical guides within which such sliders can move, a horizontal guide along which the guides of the vertical sliders may be moved and to which they may be fixed to fix them in any desired position in relation to one another, a carrier-bar slidingly fitted within both the vertical sliders, means by which the sliders may be raised together through the medium of such carrier-bar, and a vertical revolving tool-spindle carried by each slider, substantially as set forth.

In witness whereof we have hereunto signed our names, this 24th day of September, 1904, in the presence of two subscribing witnesses.

THOMAS WILSON LOVATT.
CHARLES PURSER.

Witnesses:
ROBERT G. GROVES,
HENRY J. COOPER.